United States Patent
Paganelli et al.

(10) Patent No.: US 9,559,369 B2
(45) Date of Patent: Jan. 31, 2017

(54) FUEL CELL SUPPLY SYSTEM

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Gino Paganelli, Clermont-Ferrand (FR); David Olsommer, Clermont-Ferrand (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 95 days.

(21) Appl. No.: 14/411,306

(22) PCT Filed: Jun. 24, 2013

(86) PCT No.: PCT/EP2013/063134
§ 371 (c)(1),
(2) Date: Dec. 24, 2014

(87) PCT Pub. No.: WO2014/001253
PCT Pub. Date: Jan. 3, 2014

(65) Prior Publication Data
US 2015/0380752 A1    Dec. 31, 2015

(30) Foreign Application Priority Data
Jun. 27, 2012 (FR) ..................... 12 56090

(51) Int. Cl.
*H01M 8/04* (2016.01)
*F17C 11/00* (2006.01)

(52) U.S. Cl.
CPC ........ *H01M 8/04223* (2013.01); *F17C 11/005* (2013.01); *H01M 8/04089* (2013.01);
(Continued)

(58) Field of Classification Search
CPC ................. H01M 8/04223; H01M 8/04201
See application file for complete search history.

(56) References Cited

U.S. PATENT DOCUMENTS

2009/0214906 A1* 8/2009 Reiser ............... H01M 8/04097
429/415
2009/0220831 A1* 9/2009 Reoser ............... H01M 8/04201
429/415

(Continued)

FOREIGN PATENT DOCUMENTS

FR        2 952 232      5/2011
JP        2001-214206    8/2001

*Primary Examiner* — Stewart Fraser
(74) *Attorney, Agent, or Firm* — Cozen O'Connor

(57) ABSTRACT

A supply system of the anode circuit of a fuel cell (1) comprising: a primary fuel tank (2) intended to supply the anode circuit during an operating phase of the fuel cell, a secondary fuel tank (4) intended to supply the anode circuit when the fuel cell is shut down, the primary and secondary tanks are installed so that the secondary tank is recharged with fuel from the primary tank during an operating phase of the fuel cell, and the system further comprises a permeable membrane (6) installed between the secondary fuel tank and the anode circuit of a fuel cell. Also disclosed is a fuel cell system comprising a fuel cell and the described supply system.

12 Claims, 1 Drawing Sheet

(52) U.S. Cl.
CPC ... *H01M 8/04201* (2013.01); *H01M 8/04208* (2013.01); *H01M 8/04216* (2013.01); *Y02E 60/50* (2013.01)

(56) References Cited

U.S. PATENT DOCUMENTS

| | | | |
|---|---|---|---|
| 2009/0220832 A1* | 9/2009 | Reiser | H01M 8/04201 429/415 |
| 2010/0143810 A1 | 6/2010 | Heidrich et al. | |
| 2011/0003222 A1* | 1/2011 | Margiott | H01M 8/04223 429/429 |
| 2012/0308906 A1 | 12/2012 | Paganelli | |

\* cited by examiner

FUEL CELL SUPPLY SYSTEM

RELATED APPLICATIONS

This is a U.S. National stage of International application No PCT/EP2013/063134 filed on Jun. 24, 2013.

This patent application claims the priority of French application no. 12/56090 filed Jun. 27, 2012 the disclosure content of which is hereby incorporated by reference.

FIELD OF THE INVENTION

The present invention relates to fuel cells, especially fuel cells that are supplied with hydrogen. Specifically, the present invention relates to a fuel cell supply system.

BACKGROUND OF THE INVENTION

It is known that fuel cells enable electrical energy to be produced directly via an electrochemical redox reaction using hydrogen (the fuel) and oxygen (the oxidant), without passing via a mechanical energy conversion step. This technology seems promising, especially for motor vehicle applications.

A fuel cell comprises in general the series combination of unitary elements each consisting essentially of an anode and a cathode separated by a polymer membrane allowing ions to pass from the anode to the cathode. This combination is also referred to as a stack. A fuel cell comprises an anode circuit, via which the fuel, for example hydrogen, is brought to the anode, and a cathode circuit, by which the oxidant, for example oxygen, is brought to the cathode, during the operating phases of the cell.

On the other hand, when the fuel cell is shut down, the cell's supply of fuel and oxidant is cut off. Yet it has been observed that the presence of fuel in the anode circuit of the cell, even during shutdown phases, makes it possible to slow down the degradation of the cell, and thus to lengthen the service life thereof. Indeed, the presence of hydrogen in the cell makes it possible to guarantee a zero electrochemical voltage, and thus to prevent unwanted electrochemical reactions during long periods when the cell remains shut down.

Fuel cells are known in which a presence of hydrogen at the anode during short shutdown phases is achieved by terminating the shutdown with an excess of hydrogen in the anode circuit. In this case, the cathode circuit is pressurized with nitrogen taken from the air. However, the known fuel cells do not make it possible to achieve perfect leaktightness of the stack. Indeed, the stack consists of bipolar plates and membrane electrode assemblies, the leaktightness between the various components being ensured with the aid of seals that have a certain gas permeability. Thus, a gas such as hydrogen or other fuel present at the anode has a tendency to migrate to the outside of the cell over time. Conversely, the air present in the atmosphere has a tendency to enter the anode, which proves prejudicial for the service life of the fuel cells. Indeed, the oxygen introduced with the air has a tendency to react with the hydrogen due to the catalyst present in the fuel cell, which tends to make the residual hydrogen disappear. When the hydrogen has completely disappeared, the oxygen then imposes its electrochemical potential of 1.48V on the electrodes, which promotes corrosion.

In order to overcome this drawback, a solution has been proposed that consists, when the hydrogen concentration passes below a certain threshold, in opening the tank in order to reintroduce a certain pressure of hydrogen into the stack. This solution, although effective, is not however satisfactory in terms of safety. Specifically, it would mean that the vehicle could open the main valve of the hydrogen tank without human presence, which proves to be dangerous.

Also known, from application WO2007/090284, are fuel cell systems comprising a main tank that delivers hydrogen during an operating phase of the fuel cell and a secondary tank that delivers hydrogen during the shutdown of the fuel cell. However, the system described in this application does not guarantee that a hydrogen presence is maintained until the next restarting.

SUMMARY OF THE INVENTION

One object of the present invention is to provide a solution that makes it possible to overcome all or some of the problems stated above. For this purpose, the present invention aims to propose a fuel cell supply system that makes it possible to guarantee a correct level of fuel in the cell In complete safety.

To achieve this and other objects, one aspect of the invention is directed to a supply system of the anode circuit of a fuel cell comprising:

a primary fuel tank intended to supply the anode circuit during an operating phase of the fuel cell, a secondary fuel tank intended to supply the anode circuit when the fuel cell is shut down, the primary and secondary tanks being installed so that the secondary tank is recharged with fuel from the primary tank during an operating phase of the fuel cell, and the system comprising a permeable membrane installed between the secondary fuel tank and the anode circuit of a fuel cell.

The primary fuel tank is a tank such as existing in fuel cells, containing fuel, for example hydrogen. In the remainder of the description, the examples described will relate to hydrogen cells, but the invention also covers the use of cells that use another fuel.

The secondary tank has a smaller capacity compared to the primary tank, since the amount of hydrogen to be released during the shutdown phases is smaller than the amount of hydrogen needed for the operation of a cell. Furthermore, in one embodiment of the invention, the secondary tank comprises metal hydrides. Thus, the hydrogen present in the secondary tank is in a smaller amount than in the primary tank, and it is absorbed into metal hydrides, which guarantees a safety of the system since the opening of the secondary tank cannot lead to a rapid discharge.

The secondary tank of the supply system is placed so that hydrogen from the primary tank recharges the hydrides present in the secondary tank, which makes it possible to store the hydrogen under a lower pressure, for example of the order of four bar.

In another embodiment of the invention, the system comprises a fuel cell inlet valve that makes it possible to allow or prevent the supplying of the anode circuit by the primary fuel tank. Thus, when the cell is shutdown, this valve is in the closed position, which means that the hydrogen contained in the primary tank is not transferred to the fuel cell.

In one particular embodiment of the invention, the inlet valve of the fuel cell is also installed in the circuit connecting the secondary tank to the anode circuit of the cell. Within this context, the permeable membrane is, optionally, installed in parallel to the valve. Indeed, in this embodiment, the inlet valve of the fuel cell, when it is in the closed position, prevents access of the hydrogen to the fuel cell, whether this hydrogen originates from the primary or secondary tank. In such a situation, and in order to guarantee the supply of hydrogen via the secondary tank, it is useful to position the permeable membrane parallel to the valve in order to offer an alternative circuit during the shutdown phases of the cell.

Advantageously, this permeable membrane is, for example, installed directly in the body of the inlet valve of the fuel cell.

This membrane comprises, in one embodiment of the invention, a disc made of a polymer material, for example silicone and a grid installed on each of the faces of the disc. These components will be described in detail later on.

Another aspect of the invention relates to a fuel cell system comprising a fuel cell and a supply system according to an embodiment of the invention.

BRIEF DESCRIPTION OF THE DRAWINGS

Other objectives and advantages of the invention will become clearly apparent in the following description of a preferred but non-limiting embodiment, illustrated by the following figures in which.

DESCRIPTION OF THE DRAWINGS

Figure 1:
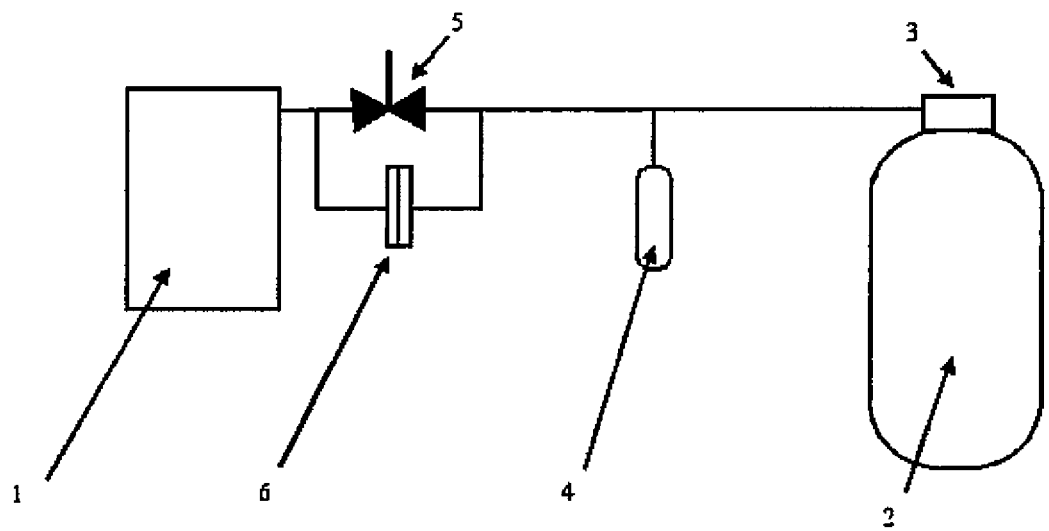
FIG. 1 shows a supply system according to an embodiment of the invention, supplying a fuel cell.

FIG. 1 shows a supply system according to the invention, intended to supply a fuel cell 1. This fuel cell is, for example, a cell of hydrogen/oxygen or hydrogen/air type, that is to say that hydrogen is the fuel, and that the oxidant is pure oxygen or air.

The supply system comprises a primary tank 2, in which hydrogen is stored under pressure, for example under a pressure of eight bar. The primary tank comprises a component 3 that acts both as a valve for opening and closing the tank, and also as an expansion valve releasing hydrogen under a pressure lower than eight bar.

The system additionally comprises a secondary tank 4 comprising metal hydrides, that make it possible to store hydrogen. As shown in the figure, the secondary tank 4 is located on the supply line connecting the primary tank 2 to the fuel cell, which enables a recharging of the secondary tank 4 during the operating phases of the cell. Indeed, the type of hydride present in the secondary tank is chosen, for example, so as to be recharged at a pressure above four bar, at 24° C. Thus, if the pressure in the supply line is of the order of eight bar, the recharging will take place during the operation of the cell.

The system additionally comprises a permeable membrane 6 installed in parallel to the inlet valve 5 of the fuel cell. During a shutdown of the fuel cell, the valve 5 is closed, but the membrane 6 makes it possible to slowly release hydrogen from the secondary tank 4 to the anode circuit of the fuel cell. This permeable membrane, also referred to as a graded permeability membrane is, depending on the exemplary embodiments, mounted in parallel as in the figure, or mounted directly on the body of the inlet valve 5.

The permeable membrane is sized preferentially to withstand pressure of eight bar present in the supply line. Indeed, as can be seen in FIG. 1, in the operating phase, the membrane is subjected to the pressure of the hydrogen from the primary tank 2 and supplying the fuel cell. Furthermore, the membrane is sized so as to offer a compromise between the rate of release of hydrogen and the compensation for the hydrogen losses.

Figure 2:
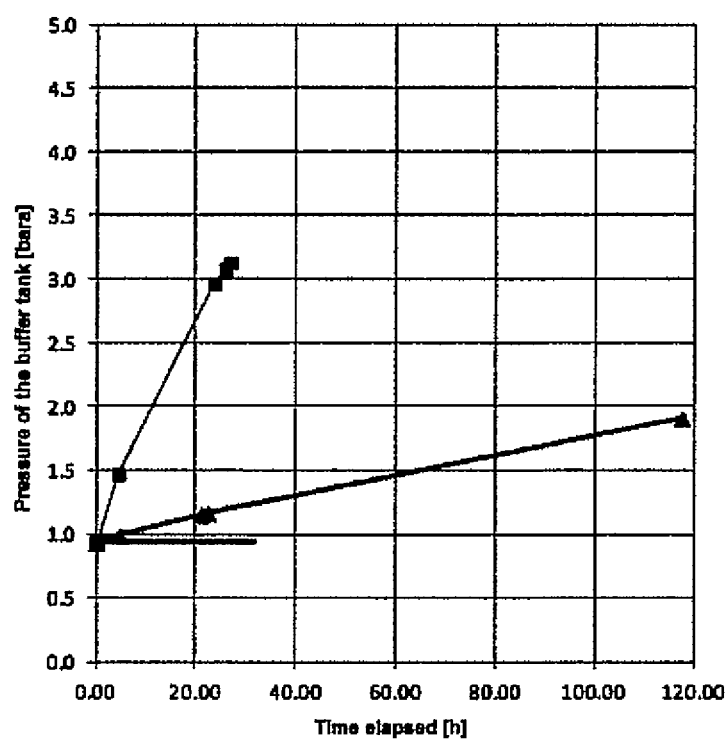
FIG. 2 is a graph showing permeability measurements carried out on various membranes.

FIG. 2 is a graph showing permeability measurements carried out on various membranes. The upper curve corresponds to a glass fibre and silicone membrane, having a thickness of 0.25 mm. The middle curve corresponds to a uniquely silicone membrane, having a thickness of 0.25 mm, and the lower curve corresponds to a uniquely silicone membrane, having a thickness of 0.41 mm. These graphs represent the change in the pressure in the fuel cell, in the ideal case where the fuel cell would be completely leaktight. For the purposes of the test, in order to quantify the permeability of the various membranes, the fuel cell was replaced by a buffer tank having a volume equivalent to that of the fuel cell, and the pressure of this buffer tank was raised over time. The pressure measurement thus carried out makes it possible to determine the amount of hydrogen released, and therefore to deduce therefrom the permeability of the membrane tested.

If the membrane has too high a permeability, as shown in the upper curve, hydrogen is released too rapidly into the fuel cell. This means that the secondary tank must be more generously sized, in order to guarantee a presence of hydrogen throughout the shutdown phase of the cell. However, the use of too large a tank may prove dangerous, as in the systems known from the prior art.

If, on the contrary, the membrane has too low a permeability, as in the lower curve, hydrogen is not released in a sufficient amount to compensate for the hydrogen losses from the stack to the outside, and does not therefore make it possible to guarantee a presence of hydrogen in the stack.

Thus, in one advantageous example, the membrane comprises a silicone disc having a thickness of 0.25 mm and a diameter of 20 mm. This silicone disc comprises, on each of its faces, a stainless steel grid having a diameter of 15 mm, making it possible to diffuse hydrogen over the surface. The disc and the grids are advantageously held in a leaktight manner between two cylindrical parts.

The invention claimed is:

1. A supply system for an anode circuit of a fuel cell comprising:
   a primary fuel tank configured to supply the anode circuit during an operating phase of the fuel cell;
   a secondary fuel tank configured to supply the anode circuit when the fuel cell is shut down; and
   an inlet valve configured to allow or prevent the supplying of the anode circuit by the primary fuel tank,
   wherein the primary and secondary fuel tanks are arranged so that the secondary tank is recharged with fuel from the primary tank during an operating phase of the fuel cell,
   wherein the system further comprises a permeable membrane arranged between the secondary fuel tank and the anode circuit of the fuel cell, and
   wherein the permeable membrane is arranged directly in the body of the inlet valve.

2. The supply system according to claim 1, wherein the secondary tank comprises metal hydrides.

3. The supply system according to claim 1, wherein the permeable membrane comprises a disc made of a polymer material and a grid installed on each of the faces of the disc.

4. The supply system according to claim 3, wherein the disc is made of silicone.

5. The supply system according to claim 3, wherein the silicone disc and the grids are held in a leaktight manner between two cylindrical parts.

6. The supply system according to claim 3, wherein the silicone disc has a thickness of 0.25 millimeters.

7. The supply system according to claim 1, wherein the membrane is sized to withstand a pressure of 8 bar without breaking.

8. A fuel cell system comprising a fuel cell and a supply system according to claim 1.

9. A supply system for an anode circuit of a fuel cell comprising:
- a primary fuel tank configured to supply the anode circuit during an operating phase of the fuel cell; and
- a secondary fuel tank configured to supply the anode circuit when the fuel cell is shut down,
- wherein the primary and secondary fuel tanks are arranged so that the secondary tank is recharged with fuel from the primary tank during an operating phase of the fuel cell,
- wherein the system further comprises a permeable membrane arranged between the secondary fuel tank and the anode circuit of the fuel cell, and
- wherein the permeable membrane comprises a disc made of a polymer material and a grid installed on each of the faces of the disc.

10. The supply system according to claim 9, wherein the disc is made of silicone.

11. The supply system according to claim 9, wherein the silicone disc and the grids are held in a leaktight manner between two cylindrical parts.

12. The supply system according to claim 9, wherein the silicone disc has a thickness of 0.25 millimeters.

\* \* \* \* \*